US007899801B1

(12) United States Patent
Bronson et al.

(10) Patent No.: US 7,899,801 B1
(45) Date of Patent: Mar. 1, 2011

(54) DETERMINING CONTENT TO BE PROVIDED BY AN ENTITY FOR RENDERING VIA A RESOURCE IN A TARGET DOCUMENT OR NOTIFYING AN ALTERNATIVE ENTITY OF THE AVAILABILITY OF THE RESOURCE

(75) Inventors: Kenneth W. Bronson, Venice, CA (US); Kevan Quincy Newton, Los Angeles, CA (US); Jason Liebman, New York, NY (US); Rama Ranganath, Mountain View, CA (US); Narayanan Shivakumar, San Jose, CA (US); Deepak Jindal, Mountain View, CA (US); Yingwei Claire Cui, Cupertino, CA (US)

(73) Assignee: Google, Inc., Mountain View, CA (US)

( * ) Notice: Subject to any disclaimer, the term of this patent is extended or adjusted under 35 U.S.C. 154(b) by 862 days.

(21) Appl. No.: 10/732,824

(22) Filed: Dec. 10, 2003

(51) Int. Cl.
G06F 7/00 (2006.01)
(52) U.S. Cl. .................................................. 707/706
(58) Field of Classification Search ............... 707/104.1
See application file for complete search history.

(56) References Cited

U.S. PATENT DOCUMENTS

| | | | |
|---|---|---|---|
| 5,724,521 A | 3/1998 | Dedrick | |
| 5,740,549 A | 4/1998 | Reilly et al. | |
| 5,848,397 A | 12/1998 | Marsh et al. | |
| 5,948,061 A | 9/1999 | Merriman | |
| 6,026,368 A | 2/2000 | Brown et al. | |
| 6,044,376 A | 3/2000 | Kurtzman, II | |
| 6,078,914 A | 6/2000 | Redfern | |
| 6,144,944 A | 11/2000 | Kurtzman, II et al. | |
| 6,167,382 A | 12/2000 | Sparks et al. | |
| 6,269,361 B1 | 7/2001 | Davis et al. | |
| 6,401,075 B1 | 6/2002 | Mason et al. | |
| 6,665,658 B1 * | 12/2003 | DaCosta et al. | 1/1 |
| 6,701,350 B1 * | 3/2004 | Mitchell | 709/217 |
| 6,804,659 B1 * | 10/2004 | Graham et al. | 705/14 |
| 6,959,424 B1 * | 10/2005 | Gardner et al. | 715/853 |
| 6,985,882 B1 | 1/2006 | Del Sesto | |
| 7,039,599 B2 | 5/2006 | Merriman | |
| 7,136,875 B2 | 11/2006 | Anderson et al. | |

(Continued)

FOREIGN PATENT DOCUMENTS

WO    WO 97/21183    6/1997

OTHER PUBLICATIONS

U.S. Appl. No. 95/001,073, filed Oct. 24, 2008, Reexamination of Stone et al.

(Continued)

*Primary Examiner* — Tim T. Vo
*Assistant Examiner* — Aaron Sanders
(74) *Attorney, Agent, or Firm* — Straub & Pokotylo; John C. Pokotylo (57) ABSTRACT

A method and system for allowing a resource associated with a target document usable for ad rendering by a first entity to be used for rendering of content by a second entity. Depending on one or more conditions, the first entity either uses the resource to render at least one ad or allows a second entity to use at least a portion of the resource to render content.

32 Claims, 4 Drawing Sheets

U.S. PATENT DOCUMENTS

| | | | | |
|---|---|---|---|---|
| 2002/0007393 | A1* | 1/2002 | Hamel | 709/203 |
| 2002/0010757 | A1* | 1/2002 | Granik et al. | 709/218 |
| 2002/0120629 | A1* | 8/2002 | Leonard | 707/100 |
| 2003/0004796 | A1* | 1/2003 | Struble | 705/14 |
| 2003/0131095 | A1* | 7/2003 | Kumhyr et al. | 709/224 |
| 2003/0220918 | A1* | 11/2003 | Roy et al. | 707/3 |
| 2004/0019523 | A1* | 1/2004 | Barry et al. | 705/14 |
| 2004/0044571 | A1* | 3/2004 | Bronnimann et al. | 705/14 |
| 2004/0054589 | A1* | 3/2004 | Nicholas et al. | 705/14 |

OTHER PUBLICATIONS

U.S. Appl. No. 95/001,061, filed Sep. 25, 2008, Reexamination of Stone et al.
U.S. Appl. No. 95/001,069, filed Oct. 17, 2008, Reexamination of Stone et al.
U.S. Appl. No. 95/001,068, filed Oct. 9, 2008, Reexamination of Stone et al.
Dedrick, R., Interactive Electronic Advertising, IEEE, 1994.
Dedrick, R., A Consumption Model for Targeted Electronic Advertising, Intel Architecture Labs, IEEE, 1995.
Baseview Products, Inc., ClassManagerPro Administration Manual v. 1.0.5, Feb. 1, 1997.
Ad-Star.com website archive from www. Archive.org, Apr. 12, 1997 and Feb. 1, 1997.
Information Access Technologies, Inc., Aaddzz brochure, "The Best Way To Buy and Sell Web Advertising Space," © 1997.
Information Access Technologies, Inc., Aaddzz.com website archive from www.Archive.org, archived on Jan. 30, 1998.
AdKnowledge Market Match Planner: Reviewer's Guide, AdKnowledge, May 1998.
AdKnowledge Campaign Manager: Reviewer's Guide, AdKnowledge, Aug. 1998.
Baseview Products, Inc., AdManagerPro Administration Manual v. 2.0, Dec. 1998.
AdForce, Inc., A Complete Guide to AdForce, Version 2.6, 1998.
AdForce, Inc., S-1/A SEC Filing, May 6, 1999.
Business Wire, "Global Network, Inc. Enters Into Agreement in Principle With Major Advertising Agency," Oct. 4, 1999.
Zeff, R. et al., *Advertising on the Internet*, $2^{nd}$ Ed., John Wiley & Sons, 1999.
Request for Reexamination of U.S. Patent No. 7,240,025 B2, U.S. Appl. No. 95/001,073.
Request for Reexamination of U.S. Patent No. 6,446,045 B1, U.S. Appl. No. 95/001,061.
Request for Reexamination of U.S. Patent No. 7,249,059 B2, U.S. Appl. No. 95/001,069.
Request for Reexamination of U.S. Patent No. 6,829,587 B2, U.S. Appl. No. 95/001,068.
Statement Regarding References in 1449 Form.

* cited by examiner

DETERMINING CONTENT TO BE PROVIDED BY AN ENTITY FOR RENDERING VIA A RESOURCE IN A TARGET DOCUMENT OR NOTIFYING AN ALTERNATIVE ENTITY OF THE AVAILABILITY OF THE RESOURCE

BACKGROUND

1. Field of the Invention

The present invention relates to online (e.g., Internet) advertising, and more particularly, to a method and apparatus for an advertising system "returning" a content-served ad resource of a target document(s) when the advertising system determines that one or more ads should not be served using the resource.

2. Background of the Invention

Interactive media, such as the Internet, has the potential for effective targeting of advertisements (or "ads") relative to traditional media, such as radio, television, print publications, etc. For example, some websites provide an information search functionality that is based on query keywords entered by the user seeking information. This user query can be used as an indicator of the type of information of interest to the user. By comparing the user query to a list of keywords specified by an advertiser, it is possible to provide some form of targeted advertisements to these search service users. For example, if a user enters the query term "sport utility vehicle," the result page (which typically displays links to web documents determined to be relevant to the user's query) may display advertisers' ads associated with this query term (e.g., sport utility vehicle manufacturer ads, auto dealer ads, service and repair ads, etc.). An example of such a system is the ADWORDS® advertising system offered by Google, Inc.

While systems such as the ADWORDS® advertising system have provided advertisers the ability to better target ads to user interest, their effectiveness is limited to sites where a user enters a search query to indicate their topic of interest. However, the majority of web pages do not offer search functionality and for these pages it may be more difficult for advertisers to target their ads. As a result, the (non-targeted) ads on non-search pages may be of little value to the viewer of the page and thus may be viewed more as an annoyance than a source of useful information. Not surprisingly, these ads typically provide the advertiser with a lower return on investment than search-based ads, which are more targeted.

Recently, ad systems have been developed which can provide targeted ads on web documents, irrespective of whether such documents provide search capability or the user enters a query to access the document. For example, such ad systems include "content ad" systems that may dynamically analyze the content of a target document (which does not necessarily include search functionality) to determine whether any ads provided by one or more advertisers to the ad system are relevant to the content of the target document. If so, such an ad system may provide one or more ads to be served via a resource (e.g., page/display space, audio resource, etc.) of the target document to an end user (also referred to as an "advertising target"). An example of a content ad system is described in U.S. patent application Ser. No. 10/375,900, entitled "Serving Advertisements Based on Content," filed Feb. 26, 2003 which is assigned to the assignee of the present application and is hereby incorporated by reference in its entirety herein.

Typically, online advertising systems collect payment from advertisers based on one or more factors, such as the amount an advertiser is willing to pay for a specific placement of its ad relative to other ads or content, the key words with which the advertiser wishes its ads to be associated, the amount or frequency with which its ads are output by the advertising system (sometimes referred to as the "impressions" of the ad), the number of times its ads are selected by advertising targets (i.e., the users to whom the ads are displayed or otherwise output by the vis-à-vis the advertising system), or some factor(s) typically relating to the performance (e.g., impressions, clickthrough, etc.) of the ad.

In a content ad system, payment may, but does not necessarily, also flow from the content ad system to a publisher of the target document. A publisher, as used herein, is defined broadly to any entity (e.g., author/owner) or mechanism (e.g., a browser) that directly or indirectly can make a target document available (e.g., displayed or otherwise output via a browser) to a user. For example, the content ad system may share revenue with the publisher based on the performance of ads the content ad system provides via a resource of the target document. Alternatively or in addition, the content ad system may pay the publisher a flat fee for rendering one or more ads via the target web document. A commercially available example of a content ad system is the ADSENSE® advertising system and service offered by Google, Inc.

In some situations, it may be advantageous for a content ad system not to provide advertisers' ads in conjunction with a target web document. For example, the web document may be unavailable to the content ad system to enable it to match/target relevant ads to the content of the web document. On the other hand, providing an ad would be inappropriate if the target document contains content that is "sensitive" or "negative" (e.g., if the content relates to a tragic news story, pornography, alcohol or tobacco, gambling, guns, etc.).

In such situations, prior content ad systems typically may provide untargeted ads, inappropriate ads (e.g., a gun ad in conjunction with a tragic story about someone being killed by a gun) or provide "charitable" or "house" ads to the publisher. Unfortunately, these options may diminish ad performance (thereby decreasing net revenue or even creating net monetary loss for the content ad system and/or the publisher) or may lower user experience on the target web document (e.g., if irrelevant or inappropriate ads are provided) or both. In the latter instance, a user may become desensitized to, or even annoyed by, irrelevant or offensive ads.

Thus, what is desirable is a method and system for overcoming the above-described limitation(s) associated with prior ad systems.

SUMMARY OF THE INVENTION

According to one aspect of the invention, one or more situations are identified by an ad system, in which situations a content ad system should not provide ads in association with a target document.

According to another aspect of the invention, in a situation in which a content ad system determines that it should not provide one or more ads in association with a target document, a resource for rendering such ads in conjunction with the target document may be "returned" to another entity, for example, for rendering of alternative ads or other content.

DETAILED DESCRIPTION

The present invention provides methods and systems for allowing an ad system to identify situations where it should not provide ads vis-à-vis a resource of a target web document, and in those situations, allow "return" (e.g., refusal, redirect, etc.) of the resource. For example, in one embodiment of the invention, if the content ad system determines it cannot or should not render one or more ads via the resource, the content ad system may redirect an ad request associated with the target document to an alternative entity which may provide ad or other content via the resource. The alternative entity may be predefined by another entity or mechanism, e.g., the publisher of the target document. With respect to providing ads in conjunction with a target document, a "resource" of the target document as used herein broadly refers to one or combination of channels associated with the target document in which advertising may be output to a user, including without limitation a display area of the target document (e.g., a frame or other displayed portion of a web document), an audio file which may be output along with the target document, etc. Other aspects, features, and benefits of the invention will become apparent from the following description of exemplary embodiments thereof.

Exemplary Architecture

Figure 1:
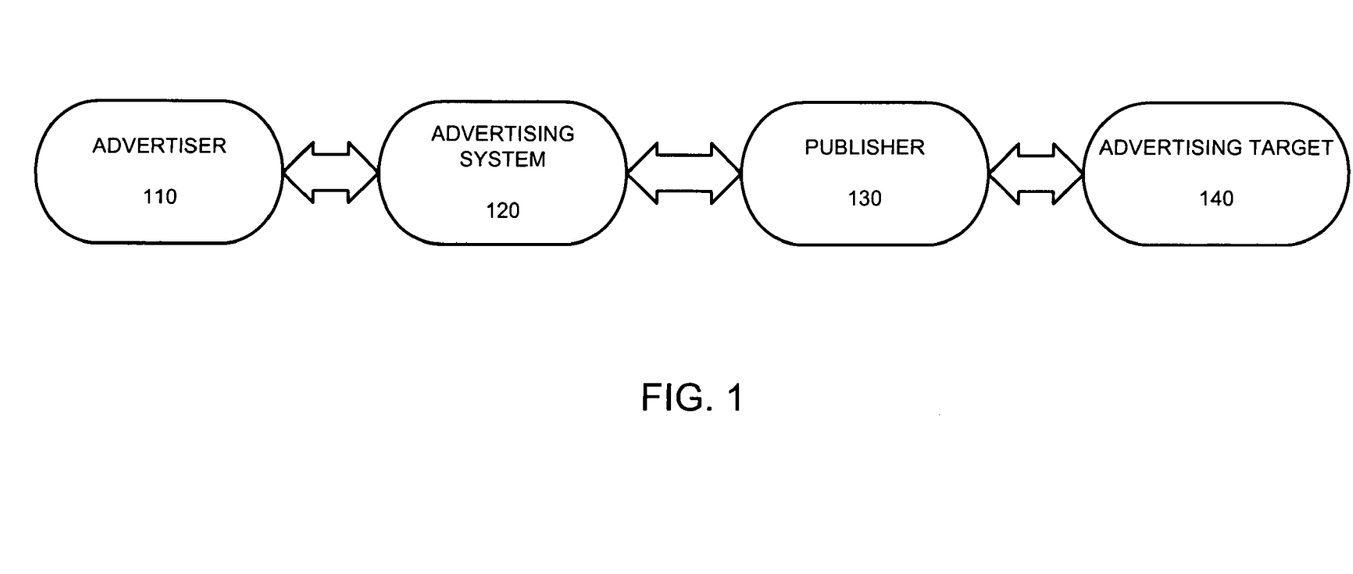
FIG. 1 is a diagram illustrating an environment within which an embodiment of the invention may be implemented.

FIG. 1 is a diagram illustrating an environment within which an embodiment of the invention may be implemented. The environment includes an advertiser 110, an advertising system 120, a publisher 130, and an advertising target 140.

Advertiser 110 may be the party that directly sells the goods or services being advertised or an agent authorized to act on the advertiser's behalf. The advertisement (or "ad") desired by advertiser 110 may exist in a variety of forms ranging from standard print advertisements, online advertisements, audio advertisements, audio/visual advertisements, or any other type of sensory message desired.

Advertising system 120 interfaces with both the advertiser 110 and the publisher 130. It may perform a variety of functions, as explained in more detail below in reference to FIG. 2. One embodiment of the invention may be used with such an advertising system 120.

Publisher 130 is the entity (e.g., owner, author or other provider of a target document) or mechanism (e.g., browser or other mechanism) that may request and/or obtain advertisements ("ads") from advertising system 120 to be output in conjunction with a target document. The advertising system 120 may provide such ads periodically to the publisher 130, which may or may not issue requests for the same to the advertising system 120. In one embodiment, when a user/advertising target requests the target document (e.g., using a browsing program), the publisher 130 may issues a request for an ad to the advertising system 120 for rendering of one or more ads vis-à-vis a resource of the target document.

The publisher 130 may obtain the requested advertisements from the advertising system 120 and present the advertisement to the advertising target 140 in conjunction with the target document. For example, one or more ads provided by the advertising system 120 may be displayed on a portion of the target document when the target document is generated for display to the advertising target. Typically, the publisher 130 is the entity that provides the content (e.g., the target document) with which the advertisement is to be associated. In one implementation, the publisher 130 is a web search engine, such as that employed by Google, Inc. at www.google.com. In another implementation, the publisher 130 may or may not include search functionality.

In another embodiment, the publisher 130 refers to a mechanism that facilitates output of a target to the advertising target 140. For example, the publisher may include a browser, document cache/database or other mechanism that may not be directly associated with the target document.

Advertising target 140 is the user or set of users who ultimately may receive the advertisement. In the case of visual advertisements, for example, the advertisement target 140 is the person who views the advertisement as displayed on the target document provided by the publisher 130. In one embodiment, when the advertising target 140 navigates to the target document (e.g., by entering its URL into a browser used by the advertising target 140, linking to it from another document, etc.), the publisher 130 issues a request to the advertising system 120 for rendering of one or more ads in conjunction with the target document for output to the advertising target 140. As described in further detail below with respect to one embodiment of the invention, the advertising system 120 may service (i.e., accept it and render one or more ads in conjunction with the target document) or redirect the request based on one or more criteria.

Figure 2:
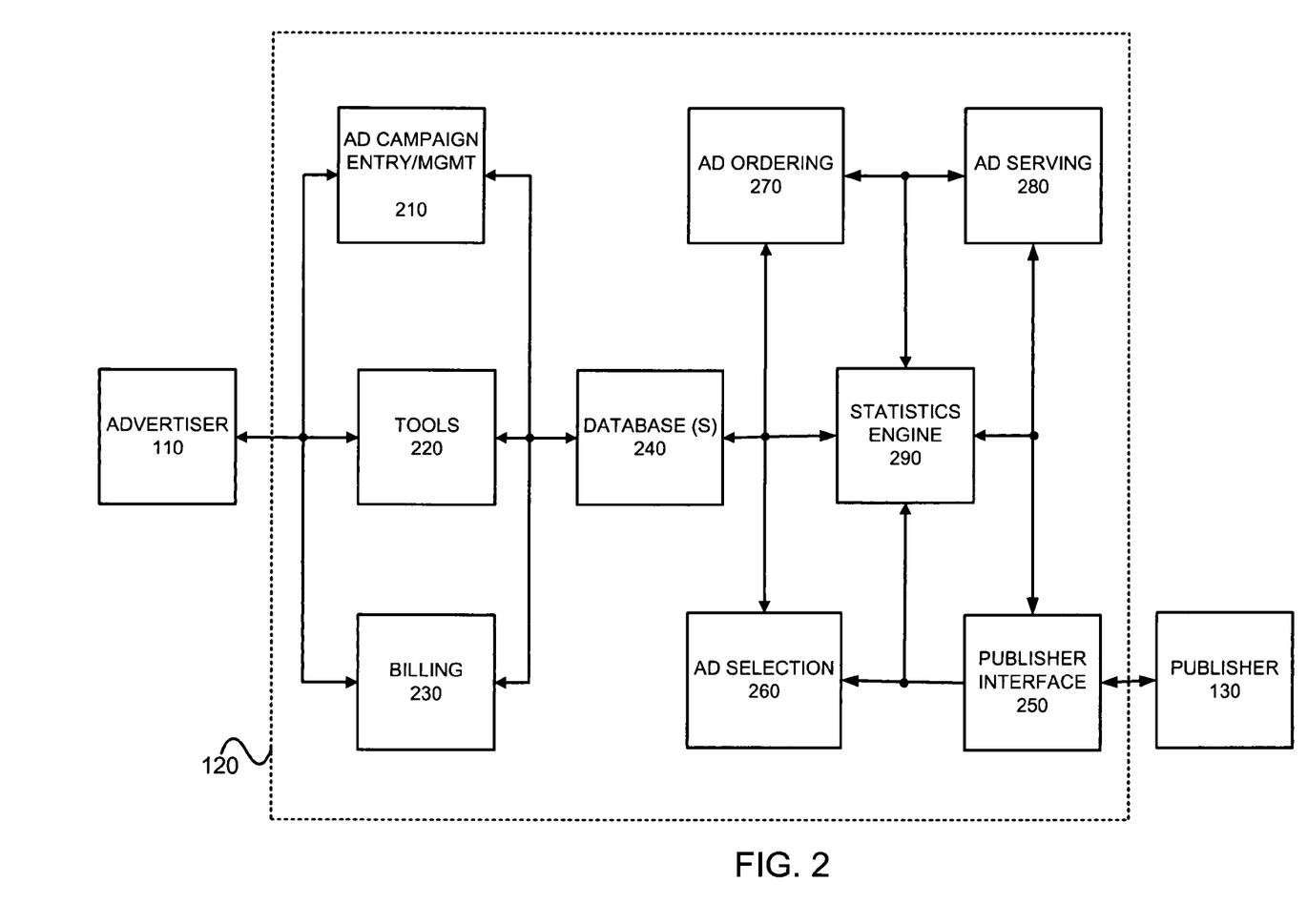
FIG. 2 is a diagram functionally illustrating an exemplary advertising system, in accordance with one embodiment of the invention.

FIG. 2 is a diagram functionally illustrating an exemplary advertising system, in accordance with one embodiment of the invention. The system includes an ad campaign entry and management component 210, a tools component 220, a billing component 230, one or more databases 240, an publisher interface component 250, an ad selection component 260, an ad ordering component 270, an ad serving component 280, and a statistics engine component 290.

To aid in the understanding of this embodiment the invention, components of the advertising system 120 will be explained below. Although FIG. 2 shows a particular arrangement of components constituting advertisement system 120, those skilled in the art will recognize that not all components need be arranged as shown, not all components are required, and that other components may be added to, or replace, those shown.

Ad entry and management component 210 is the component by which the advertiser enters information required for an advertising campaign and manages the campaign. An ad campaign contains one or more advertisements that are related in some manner. For example, the a car manufacturer may have an ad campaign for zero percent financing, which could contain a series of advertisements related to that topic. Among the other things that could be provided by an advertiser through ad entry and management component 210 are the following: one or more advertising creatives (simply referred to as "ads" or "advertisements"), one or more set of keywords or topics associated with those creatives (which may be used as targeting information for the ads), geographic targeting information, a value indication for the advertisement, start date, end date, etc. The data required for, or obtained by, ad entry and management component 210 resides in one of the databases 240.

Tools component 220 contains a variety of tools designed to help the advertiser 110 create, monitor, and manage its campaigns. For example, tools component 220 may contain a tool for helping advertiser 110 estimate the number of impressions an ad will receive for a particular keyword or topic.

Similarly, tools component 220 may be used to help advertiser 110 generate a list of keywords or topics for a given advertisement, or to generate additional keywords or topics based on representative ones supplied by advertiser 110. Other possible tools may be provided as well. Depending on the nature of the tool, one or more databases 240 may be used to gather or store information.

Billing component 230 helps perform billing-related functions. For example, billing component 230 generates invoices for a particular advertiser 110 or ad campaign. In addition, billing component 230 may be used by advertiser 110 to monitor the amount being expended for its various campaigns. The data required for, or obtained by, billing component 230 resides in a database 240.

Databases 240 contain a variety of data used by advertising system 120. In addition to the information mentioned above in reference to ad entry and management system 210, databases 240 may contain statistical information about what ads have been shown, how often they have been shown, the number of times they have been selected, who has selected those ads, how often display of the ad has led to consummation of a transaction, etc. Although the databases 240 are shown in FIG. 2 as one unit, one of ordinary skill in the art will recognize that multiple databases may be employed for gathering and storing information used in advertising system 120.

Publisher interface 250 is a component that interfaces with publisher 130 to obtain or send information. For example, publisher 130 may send a request for one or more advertisements to publisher interface 250. The request may include information such as the domain or page (e.g., uniform resource locator or URL) requesting the advertisement, any information available to aid in selecting the advertisement, the number of ads requested, etc. In response, publisher interface 250 may provide one or more advertisements to publisher 130. In addition, publisher 130 may send information about the performance of the advertisement back to the ad system via the publisher interface 250. This may include, for example, the statistical information described above in reference to a database 240. The data required for, or obtained by, publisher interface component 250 resides in a database 240.

Ad selection component 260 receives a request for a specified number of advertisements, coupled with information to help select the appropriate advertisements. This information may include, for example, a search query specified by an end user. Alternatively, or in addition, as described in more detail below, this information may include data related to the content of a target document for which the advertisements are being requested. In one embodiment, ad selection component 260 may also include hardware, software or a combination thereof for performing one or more of the methods of the invention, including determining whether to rendering one or more ads in conjunction with a target document based on one or more criteria, or to allow an alternative entity to render ads or other content.

Ad ordering component 270 receives a list of relevant ads from ad selection component 260 and determines a preference order in which they should be rendered to an end user. For example, relevant ads may be ordered based on the value indication associated with each ad. These ordered ads may be provided to an ad serving component 280.

Ad serving component 280 receives an ordered list of ads from ad ordering component 270, and formats that list into a manner suitable for presenting to publisher 130. This may involve, for example, rendering the ads into hypertext markup language (HTML), into a proprietary data format, etc.

Statistics engine 290 contains information pertaining to the selection and performance of advertisements. For example, statistics engine 290 may log the information provided by publisher 130 as part of an ad request, the ads selected for that request by ad selection component 260, the order selected by ad ordering component 270, and the presentation of the ads by ad serving component 280. In addition, statistics engine 290 may log information about what happens with the advertisement once it has been provided to publisher 130. This includes information such as on what location the ad was provided, what the response was to the advertisement, what the effect was of the advertisement, etc.

Figure 3:
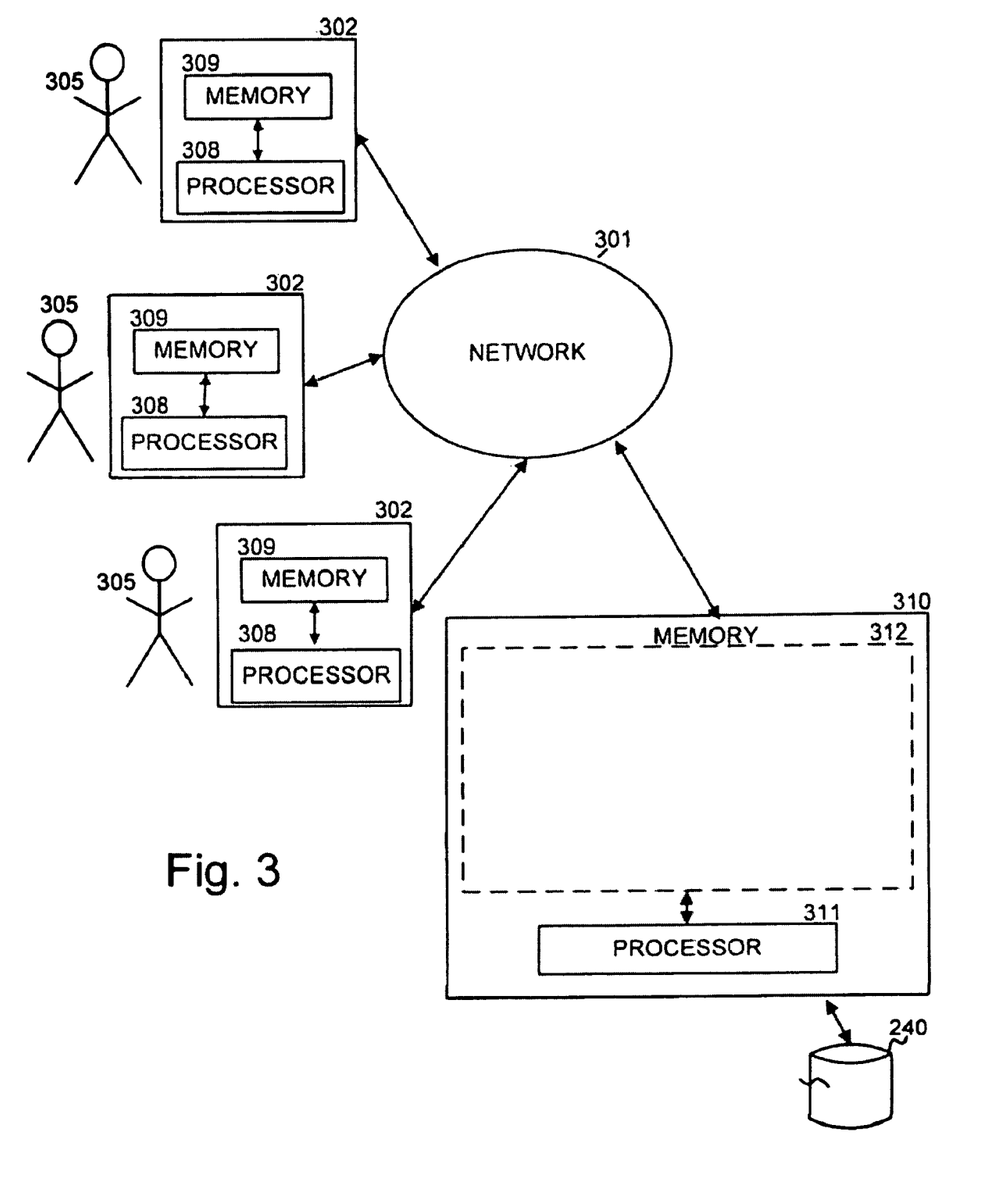
FIG. 3 is a diagram illustrating an architecture in which an embodiment of the present invention may be implemented.

FIG. 3 is a diagram illustrating an architecture in which an embodiment of the present invention may be implemented. The architecture includes multiple client devices 302, a server device 310, and a network 301, which may be, for example, the Internet. Client devices 302 each include a computer-readable medium 309, such as random access memory, coupled to a processor 308. Processor 308 executes program instructions stored in memory 309. Client devices 302 may also include a number of additional external or internal devices, such as, without limitation, a mouse, a CD-ROM, a keyboard, and a display. Thus, as will be appreciated by those skilled in the art, the client devices may be personal computers, personal digital assistants, mobile phones, content players, etc.

Through client devices 302, requestors 305 can communicate over network 301 with each other and with other systems and devices coupled to network 301, such as server device 310. Requestors 305 may, for example, be advertisers 110, publisher 130, or advertising target 140.

Similar to client devices 302, server device 310 may include a processor 311 coupled to a computer readable memory 312. Server device 310 may additionally include a secondary storage element, such as a database 240.

Client processors 308 and server processor 311 can be any of a number of well known micro-processors. In general, client device 302 may be any type of computing platform connected to a network and that interacts with application programs, such as a digital assistant or a "smart" cellular telephone or pager. Server 310, although depicted as a single computer system, may be implemented as several computer systems. Furthermore, client devices 302 or server 310 may function both as clients and servers.

Memory 312 may contain a number of programs, such as the components described above in reference to FIG. 2.

Operation

Figure 4:
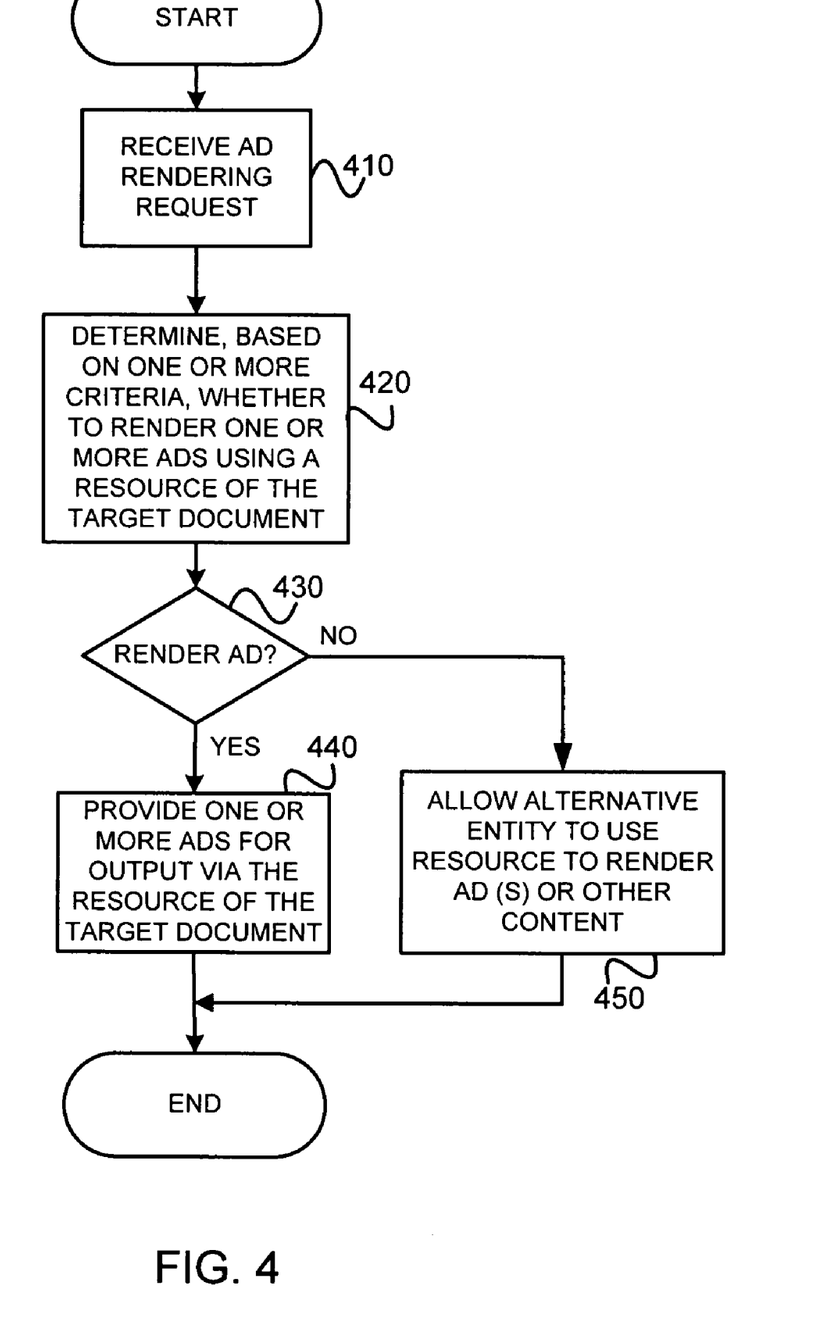
FIG. 4 is a flow diagram of allowing an advertising system to "return" a content ad resource of target document associated with an publisher, in accordance with one embodiment of the invention.

FIG. 4 is a flow diagram of allowing an advertising system to "return" a content ad resource of target document associated with an publisher, in accordance with one embodiment of the invention. As used herein, the term "document" includes any type of paper or electronic document or file, including audio, video, image, text, etc. That is, as will be appreciated by one skilled in the art, a "document" as used in the specification is any machine-readable and machine-storable work product. A document may be a file, a combination of files, one or more files with embedded links to other files, etc., and may include a web page, a collection of web pages under one or more domains, etc. A document may be cast in HTML, XML, or one or a combination or these or other formats, and may include various interactive elements such as hyperlinks, fill-in forms, etc. For the sake of illustration, it may be understood that at least a portion of the process described herein takes place as part of the ad system 120, although those skilled in the art will recognize that it need not take place in that system alone. The exemplary method is not limited by the order shown in the flow diagram.

In one implementation of the method shown in FIG. 4, the ad system 120 may provide an publisher, such as the publisher 130, with client-side JAVASCRIPT® (referred to as "ad_consumer_creative") to have hosted by its target document(s) for which ads may be requested by publisher 130. In turn, the ad system 120 may host server-side JAVASCRIPt® ("show_ads.js") to interface with the ad_consumer_creative via the publisher interface 250. In this exemplary implementation, for a given target document, the ad_consumer_creative may include a tag (referred to as "alternate_ad_url") that is an identifier, in this example, a URL, of an alternative entity.

Thus, if the advertising system determines that it should not provide an ad in conjunction with, and vis-à-vis a resource of, a target document of the publisher, it may redirect an ad rendering request associated with the target document to the alternative entity for rendering of an ad or other content by the alternative entity. For purpose of illustration, the method depicted in the flow diagram of FIG. 4 is described with reference to this exemplary, specific implementation. It will be appreciated, however, to those skilled in the art that the invention—including having an ad system determine whether or not to use or "return" an ad-serving resource of a target document—is not limited to this particular implementation.

At block 410, an ad rendering request is received by an advertising system from an publisher for rendering of one or more ads via a resource of a target document associated with, or provided by, the publisher. In one embodiment, the request for an ad, in one embodiment, is made in response to a user requesting downloading or viewing of the target document. In another embodiment, the request may be issued to the advertising system irrespective of whether a user requests the target document. In yet another embodiment, the advertising system may perform the following method autonomously—i.e., without receiving or responding to a request for ad rendering by the publisher or other entity with which the target document is associated.

At block 420, the ad system determines, based on one or more criteria, whether to render one or more ads using a resource of the target document. The criteria could include whether a set of one or more conditions are met, in which case ad(s) may be rendered by the ad system in conjunction with, and using a resource of, a target document.

In one embodiment, the set of conditions may include one or a combination of the following: (1) whether the target document or its content available to the ad system, for example, to analyze in order to determine relevance to one or more ads; (2) the target document is deemed not to contain negative content, which could include one or a combination of subject matter related to pornography, tragic news events including accidents, promotion of gambling, firearms, tobacco, or illegal or immoral activity, etc.; (3) the ad system possesses a threshold number of relevant ads for rendering in conjunction with the target document (such relevance could depend on the degree of correlation between key word, category, geographical or other targeting criteria of the ads with the textual content, meta tag or other subject indicia of the target document); (4) one or threshold number of ads with untapped budgets are available (e.g., an ad having an untapped budget may be one for which its advertiser may be willing to pay the ad system for impressions or clicks thereof).

In one embodiment, the one or more conditions could also include a determination, which can be based on an estimate or prediction, of ad performance (e.g., clickthrough rate) or whether providing one or more ads will result in net or a threshold monetary gain or loss for the ad system. For example, the determination may be based on historical or estimated ad performance; e.g., if rendering one or more ads is expected not to result in a threshold clickthrough, the ad system may not use the resource to render the one or more ads.

Similarly, the determination may be based on the ad system determining whether the (expected) revenue (including payment from one or more advertisers) if one or more ads are rendered by the ad system in conjunction with the target document exceeds the cost to the ad system if the one or more ads are rendered. Such cost typically might include a fixed or variable payment the ad system expects to pay the publisher with which the target document is associated if the ad is rendered or the resource of the target document is otherwise used by the ad system. For example, the condition may be determined based on (historical) performance data for the target document or other documents (e.g., those having one or more concepts similar to the target document) that may indicate a likelihood of relatively low traffic, ad clickthrough, or other poor performance for an ad output in conjunction with the target document, in which case the ad system may refrain from providing an ad.

More generally, such a condition may be based on the ad system determining whether an amount to be paid to the publisher or other entity for providing one or more ads (or more generally, for using the resource of the target document to render ads or other content) exceeds the (expected) return for the ad system if those ads are rendered in conjunction with the target document; in other words, will gross return/revenue exceed cost for the ad system if one or more ads are rendered. Such return or cost may be a function of whether, how much, or how often ads are rendered in conjunction with the target document, the placement/prevalence of those ads, or the clicks those ads receive or are expected to receive from the advertising targets upon whom those ads are impressed. Thus if the ad system determines that rendering an ad using the resource of the target document will likely result in a net gain for the ad system, this condition may be deemed to have been met, which case the publisher may service the ad rendering request.

At block 430, depending on the determination at block 420 of whether one or more conditions are met or not, the ad system decides whether to render an ad using a resource of the target document. For example, if the ad system at block 420 determines that expected revenue will exceed cost for rendering an ad, then at block 430, the ad system may decide to render an ad. Conversely, if the ad system determines at block 420 that a threshold number of relevant, untapped-budget ads are not available for rendering, the target document contains "negative" or other inappropriate content, or some other condition(s) favorable for rendering an ad does not exist, then at block 420, the ad system may decide not to render an ad.

In the exemplary JAVASCRIPT® implementation described, upon receipt of an ad request associated with the target document, the show_ads.js script of the ad system creates an iframe whose source is a request to an ad server of the ad system, and also includes the alternative_ad-url parameter. In this implementation, if the ad system decides not to render an ad, its ad server may respond with a 302 HTTP status code (or some other "redirect" indication), setting the location field of an outgoing HTTP header to the url identified by the alternative_ad_url parameter—i.e., allowing an alternative entity, as indicated by the alternative_ad_url parameter, to use the resource of the target document to render an ad or other content. The alternative entity may be designated by the entity issuing the ad request (e.g., the publisher with which the target document is associated), and it may be the publisher itself, another ad system, a content provider that does not necessarily provide ads, etc.

In one embodiment, the ad system may "tag" a request for an ad with an identifier, for example, to prevent infinite loops that might occur if a redirect is sent back to the publisher (or other entity) and that entity again makes a request to the ad system, which again decides to issue a redirect, and so on. In the exemplary JAVASCRIPT® implementation, the ad system may name (e.g., by, assigning a unique number or other identifier to) an iframe it creates for a particular ad request, so that if the alternative entity redirects a redirected request back to the ad system, the ad system recognizes the name, logs a bad redirect message, and does not further redirect the request to the alternative entity.

If the ad system decides not to render an ad, then at block 450, this decision may be indicated (e.g., using a technique such as that described above with reference to an exemplary implementation of the invention using JAVASCRIPT®, iframes and use of an alternative_ad_url) such as to allow an alternative entity to use the resource to render an ad(s) or other content using the resource of the target document.

In one embodiment, if, based on one or more conditions existing or not existing, the advertising system decides not to render an ads, the advertising system may also provide an indication to the publisher and/or another (alternative) entity/ mechanism of what condition(s) existed or didn't exist that caused the decision not to render one or more ads. For example, as those skilled in the art will appreciate, a certain sequence of one or more bits may be mapped to a condition existing or not existing and provided by the ad system in response to an ad request.

The indication may enable the publisher and/or the alternative entity to render alternative content, which may or may not include ads, in conjunction with the target document, edit the target document or take some other action. For example, if the publisher decides not to render ads because the target document contains pornographic content, the indication may identify the existence of pornographic content as a basis for the decision not to render ads and the alternative entity may then provide ads or content relevant/targeted to pornographic content.

Conclusion

Thus, a method and system has been described in which a (content) ad system may determine, based on one or more criteria, not to render one or more ads in conjunction with a target document, and such determination may cause an alternative entity to render ads or other content using a resource of the target document originally allocated for ad rendering by the ad system.

General

It should be appreciated that reference throughout this specification to "one embodiment" or "an embodiment" or "an aspect" of the invention means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" or "an aspect" in various portions of this specification are NOT necessarily all referring to the same embodiment. Furthermore, the particular features, structures or characteristics of one or more embodiments or aspects described may be combined or implemented independently of each other as suitable in one or more embodiments of the invention.

It will be apparent to one of ordinary skill in the art that aspects of the invention, as described above, may be implemented in many different forms of software, firmware, and hardware in the implementations illustrated in the figures.

The actual software code or specialized control hardware used to implement aspects consistent with the present invention is not limiting of the present invention. Thus, the operation and behavior of the aspects were described without reference to the specific software code—it being understood that a person of ordinary skill in the art would be able to design software and control hardware to implement the aspects based on the description herein.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

No element, act, or instruction used in the description of the present application should be construed as critical or essential to the invention unless explicitly described as such. Also, as used herein, the article "a" is intended to include one or more items. Where only one item is intended, the term "one" or similar language is used. The term "or" means "and/or".

It should further be appreciated that, in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims (also as such may be amended, reissued, etc., from time to time) are hereby expressly incorporated into this Detailed Description, with each claim standing on its own as a separate embodiment of this invention.

What is claimed is:

1. A computer-implemented method comprising:
   receiving, by a computer system of a first entity and including at least one computer, a first ad request associated with a first target document, wherein the first target document (A) is accessible by the first entity, (B) includes content and (C) is associated with a first resource for rendering at least one advertisement;
   determining, by the computer system of the first entity and responsive to the first ad request, that the content included in the first target document cannot be analyzed by the first entity to determine if an ad relevant to the content of the first target document is available for rendering; and
   indicating, by the computer system of the first entity, the availability of at least a portion of the first resource of the first target document to a second entity.

2. The computer-implemented method of claim 1, wherein the first entity includes a content ad system.

3. The computer-implemented method of claim 2, wherein the second entity includes a publisher with which the first target document is associated.

4. The computer-implemented method of claim 3,
   wherein the act of determining that the content included in the first target document cannot be analyzed by the first entity includes determining that the first target document cannot be crawled.

5. The computer-implemented method of claim 3, further comprising:
   receiving, by the computer system of the first entity, a second ad request associated with a second target document, wherein the second target document (A) is accessible by the first entity, (B) includes content and (C) is associated with a second resource for rendering content;

determining, by the computer system and responsive to receiving the second ad request, that the content included in the second target document can be analyzed by the first entity to determine if an ad relevant to the content of the second target document is available for rendering;

determining, by the computer system of the first entity, that the second target document contains negative subject matter;

responsive to the determination that the second target document contains negative subject matter, indicating, by the computer system of the first entity, the availability of at least a portion of the second resource of the second target document to the second entity;

receiving, by the computer system of the first entity, a third ad request associated with a third target document, wherein the third target document (A) is accessible by the first entity, (B) includes content and (C) is associated with a third resource for rendering content;

determining, by the computer system of the first entity and responsive to receiving the third ad request, that the content included in the third target document can be analyzed by the first entity to determine if an ad relevant to the content of the third target document is available for rendering;

determining, by the computer system of the first entity, that the third target document does not contain negative subject matter; and responsive to the determination that the third target document does not contain negative subject matter, providing, by the computer system of the first entity, a set of at least one ad to be rendered via the third resource.

6. The computer-implemented method of claim 5, wherein negative subject matter includes at least one of tragic events, pornography, alcohol promotion, tobacco promotion, gun promotion and gambling promotion.

7. The computer-implemented method of claim 3, further comprising:
receiving, by the computer system of the first entity, a second ad request associated with a second target document, wherein the second target document (A) is accessible by the first entity, (B) includes content and (C) is associated with a second resource for rendering content;

determining, by the computer system and responsive to receiving the second ad request, that the content included in the second target document can be analyzed by the first entity to determine if an ad relevant to the content of the second target document is available for rendering;

determining, by the computer system of the first entity, that a threshold number of relevant ads are not available to render in association with the second target document;

responsive to the determination that a threshold number of relevant ads are not available to render in association with the second target document, indicating, by the computer system of the first entity, the availability of at least a portion of the second resource of the second target document to the second entity, receiving, by the computer system of the first entity, a third ad request associated with a third target document, wherein the third target document (A) is accessible by the first entity, (B) includes content and (C) is associated with a third resource for rendering content;

determining, by the computer system of the first entity and responsive to receiving the third ad request, that the content included in the third target document can be analyzed by the first entity to determine if an ad relevant to the content of the third target document is available for rendering;

determining, by the computer system of the first entity, that a threshold number of relevant ads are available to render in association with the third target document; and responsive to the determination that a threshold number of relevant ads are available to render in association with the third target document, providing, by the computer system of the first entity, a set of at least one ad to be rendered via the third resource.

8. The computer-implemented method of claim 7, wherein the threshold number of relevant ads depends on a degree of topical correlation between a plurality of ads available to the first entity and subject matter of each of the second and third target documents.

9. The computer-implemented method of claim 3, further comprising:
receiving, by the computer system of the first entity, a second ad request associated with a second target document, wherein the second target document (A) is accessible by the first entity, (B) includes content and (C) is associated with a second resource for rendering content;

determining, by the computer system and responsive to receiving the second ad request, that the content included in the second target document can be analyzed by the first entity to determine if an ad relevant to the content of the second target document is available for rendering;

determining, by the computer system of the first entity, that a threshold number of ads having untapped budgets are not available to render in association with the second target document;

responsive to the determination that a threshold number of ads having untapped budgets are not available to render in association with the second target document, indicating, by the computer system of the first entity, the availability of at least a portion of the second resource of the second target document to the second entity;

receiving, by the computer system of the first entity, a third ad request associated with a third target document, wherein the third target document (A) is accessible by the first entity, (B) includes content and (C) is associated with a third resource for rendering content;

determining, by the computer system of the first entity and responsive to receiving the third ad request, that the content included in the third target document can be analyzed by the first entity to determine if an ad relevant to the content of the third target document is available for rendering;

determining, by the computer system of the first entity, that a threshold number of ads having untapped budgets are available to render in association with the third target document; and responsive to the determination that a threshold number of ads having untapped budgets are available to render in association with the third target document, providing, by the computer system of the first entity, a set of at least one ad to be rendered via the third resource.

10. The computer-implemented method of claim 3, further comprising:
receiving, by the computer system of the first entity, a second ad request associated with a second target document, wherein the second target document (A) is accessible by the first entity, (B) includes content and (C) is associated with a second resource for rendering content;

determining, by the computer system and responsive to receiving the second ad request, that the content included in the second target document can be analyzed by the first entity to determine if an ad relevant to the content of the second target document is available for rendering;

determining, by the computer system of the first entity, that net revenue for the first entity for rendering the ad will not be positive;

responsive to the determination that net revenue for the first entity for rendering the ad will not be positive, indicating, by the computer system of the first entity, the availability of at least a portion of the second resource of the second target document to the second entity;

receiving, by the computer system of the first entity, a third ad request associated with a third target document, wherein the third target document (A) is accessible by the first entity, (B) includes content and (C) is associated with a third resource for rendering content;

determining, by the computer system of the first entity and responsive to receiving the third ad request, that the content included in the third target document can be analyzed by the first entity to determine if an ad relevant to the content of the third target document is available for rendering;

determining, by the computer system of the first entity, that net revenue for the first entity for rendering the ad will be positive; and responsive to the determination that net revenue for the first entity for rendering the ad will be positive, providing, by the computer system of the first entity, a set of at least one ad to be rendered via the third resource.

11. The computer-implemented method of claim 10, wherein the act of determining whether net revenue for rendering the ad will be positive, by the first entity, comprises:
   determining whether or not a payment is to be paid to a publisher for rendering the ad; and
   estimating gross revenue derived from an advertiser for rendering the ad in association with each of the second and third target documents.

12. The computer-implemented method of claim 11, wherein the payment depends on a number of impressions of the ad using each of the second and third resources of the corresponding target documents.

13. The computer-implemented method of claim 11, wherein the gross revenue depends on a number of impressions of the ad using each of the second and third resources of the corresponding target documents.

14. The computer-implemented method of claim 11, wherein the gross revenue depends on an estimated click-through amount for the ad if rendered using each of the second and third resources of the corresponding target documents.

15. The computer-implemented method of claim 1, wherein the first entity includes a first ad system and the second entity includes a second ad system.

16. The computer-implemented method of claim 15, wherein the first ad system is a content ad system.

17. The computer-implemented method of claim 1,
   wherein the first target document is requested by a client system and the first ad request includes an identifier of the second entity,
   wherein the first entity determines to redirect the first ad request to the second entity based on a set of one or more criteria, and
   wherein the act of indicating the availability of the first resource includes the first entity setting a location field in an outgoing hypertext protocol header with the identifier, causing the first target document to be output to the client system with the content rendered by the second entity.

18. The computer-implemented method of claim 17, wherein the identifier includes an alternative content URL.

19. The computer-implemented method of claim 17, further comprising using remote scripting to process the ad rendering request.

20. The computer-implemented method of claim 18, wherein the remote scripting includes an iframe.

21. The computer-implemented method of claim 20, wherein the iframe is named to identify the ad rendering request to the first entity.

22. The computer-implemented method of claim 1, wherein indicating the availability of at least a portion of the first resource of the first target document to a second entity includes the first entity indicating to an external entity that the first target document is not available for analysis by the first entity to determine if an ad relevant to the content of the first target document is available for rendering.

23. The computer-implemented method of claim 22, wherein the external entity is the second entity.

24. The computer-implemented method of claim 22, wherein the external entity includes a publisher.

25. The method of claim 1, wherein indicating the availability of at least a portion of the first resource to a second entity includes redirecting the first request to an alternative entity.

26. The computer-implemented method of claim 25, wherein the first request identifies the alternative entity.

27. The computer-implemented method of claim 25, wherein redirecting the first request includes an identifier to identify the first request if redirected from the alternative entity back to the ad system.

28. The method of claim 25, wherein the alternative entity includes one of (A) another ad system or (B) a publisher with which the first target document is associated.

29. A system comprising:
   at least one processor;
   at least one communications interface; and
   at least one storage device, the storage device storing program instructions which, when executed by the at least one processor, performs a method including:
   receiving, with a first entity, a first ad request associated with a first target document, wherein the first target document (A) is accessible by the first entity, (B) includes content and (C) is associated with a first resource for rendering at least one advertisement;
   determining, with the first entity and responsive to the first ad request, that the content included in the first target document cannot be analyzed by the first entity to determine if an ad relevant to the content of the first target document is available for rendering; and
   indicating, with the computer system of the first entity, the availability of at least a portion of the first resource of the first target document to a second entity.

30. The system of claim 29, wherein the first resource includes a display area on the target document.

31. A computer-implemented method comprising:
   receiving, by a content ad serving system including at least one computer on a network, an ad request associated with a target document for serving an ad via a resource of the target document, wherein the target document is associated with a publisher;
   determining, by the content ad serving system and responsive to the ad request associated with the target document, that a threshold number of ads having untapped budgets are not available to render in association with the target document; and indicating, by the content ad serving system, the availability of at least a portion of the resource of the target document to the publisher associated with the target document based on the determination that a threshold number of ads having untapped budgets are not available to render in association with the target document, wherein the act of determining that a threshold number of ads having untapped budgets are not available to render in association with the target document includes determining that the number of ads for which advertisers are willing to pay the ad serving system does not exceed a defined threshold.

32. A computer-implemented method comprising:

receiving, by a content ad serving system including at least one computer on a network, an ad request associated with a target document for serving an ad via a resource of the target document, wherein the target document is associated with a publisher;

determining, by the content ad serving system and responsive to the ad request associated with the target document, that net revenue for the content ad system for serving the ad will not be positive; and indicating, by the content ad serving system, the availability of at least a portion of the resource of the target document to the publisher associated with the target document based on the determination that net revenue for the content ad system for serving the ad will not be positive, wherein the act of determining that net revenue for serving the ad will not be positive includes (A) determining whether or not a payment is to be paid to a publisher for rendering the ad and (B) estimating cross revenue derived from an advertiser for rendering the ad in association with the target document.

* * * * *